(12) United States Patent
Tajima

(10) Patent No.: US 8,487,820 B2
(45) Date of Patent: Jul. 16, 2013

(54) EMBLEM

(75) Inventor: Minoru Tajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 466 days.

(21) Appl. No.: 12/517,918

(22) PCT Filed: Jan. 21, 2008

(86) PCT No.: PCT/JP2008/050716
§ 371 (c)(1),
(2), (4) Date: Jun. 5, 2009

(87) PCT Pub. No.: WO2008/090846
PCT Pub. Date: Jul. 31, 2008

(65) Prior Publication Data
US 2010/0085271 A1 Apr. 8, 2010

(30) Foreign Application Priority Data
Jan. 23, 2007 (JP) .................................. 2007-012905

(51) Int. Cl.
*H01Q 1/32* (2006.01)
(52) U.S. Cl.
USPC ........................................ 343/713; 343/872
(58) Field of Classification Search
USPC ......................................... 343/872, 909, 713
See application file for complete search history.

(56) References Cited

U.S. PATENT DOCUMENTS

| 6,184,842 B1 | 2/2001 | Leinweber et al. |
| 7,508,353 B2 * | 3/2009 | Shingyoji ..................... 343/909 |
| 2004/0125023 A1 * | 7/2004 | Fujii et al. ............. 343/700 MS |

FOREIGN PATENT DOCUMENTS

| JP | 2002-135030 | | 5/2002 |
| JP | 2003-202369 | | 7/2003 |
| JP | 2004 23645 | | 1/2004 |
| JP | 2004023645 A | * | 1/2004 |
| JP | 2004-251868 | | 9/2004 |
| JP | 2004 301592 | | 10/2004 |
| JP | 2004301592 A | * | 10/2004 |
| JP | 2004 309322 | | 11/2004 |
| JP | 2005 20769 | | 1/2005 |
| JP | 2006-287500 | | 10/2006 |

OTHER PUBLICATIONS

Office Action of Japanese Application No. 2008-555050 mailed Dec. 6, 2011.

* cited by examiner

*Primary Examiner* — Hoang V Nguyen
*Assistant Examiner* — Kyana R McCain
(74) *Attorney, Agent, or Firm* — Oblon, Spivak, McClelland, Maier & Neustadt, L.L.P.

(57) ABSTRACT

An emblem includes a first thickness portion having a first thickness and a second thickness portion having a second thickness thinner than the first thickness. The first thickness is equal to an integral multiple of a half of an in-medium wavelength of the radar wave inside the first thickness portion. The second thickness is a thickness equal to an integral multiple of a half of the in-medium wavelength of the radar wave inside the second thickness portion. A difference between the first thickness and the second thickness is set to an integral multiple of a free-space wavelength of the radar wave.

7 Claims, 2 Drawing Sheets

EMBLEM

TECHNICAL FIELD

The present invention relates to an emblem, and, more particularly to an emblem that is arranged on a traveling path of a radar wave that is transmitted from an in-vehicle radar apparatus.

BACKGROUND ART

Conventionally, a covering part for a radar apparatus is formed in a uniform thickness by putting two layers of resin parts having different dielectric constants together, which gives a metallic texture at low cost without degrading radar performance (for example, Patent Document 1).

Patent Document 1: Japanese Patent Application Laid-open No. 2004-309322

DISCLOSURE OF INVENTION

Problem to be Solved by the Invention

As described above, the conventional technique is characterized in that the covering part (corresponding to an emblem of the present invention) of the radar apparatus is formed in a uniform thickness to prevent degradation of the radar performance. On the other hand, application of such a characteristic means that a configuration having concaves and convexes cannot be formed on the covering part of the radar apparatus. Therefore, there has been a problem that some design requests for the covering part cannot be satisfied in this conventional technique.

The present invention has been achieved in view of the above problem, and it is an object of the present invention to provide an emblem ensuring flexibility in design request, and eliminating constraint that a configuration having concaves and convexes cannot be formed.

Means for Solving Problem

To solve the above problems, and to achieve the above objects, an emblem according to the present invention configured to be arranged on a traveling path of a radar wave that is transmitted from an in-vehicle radar apparatus, includes a first thickness portion having a first thickness and a second thickness portion having a second thickness thinner than the first thickness. The first thickness is equal to an integral multiple of a half of an in-medium wavelength of the radar wave which is a wavelength of the radar wave when propagating inside the first thickness portion, the second thickness is a thickness equal to an integral multiple of a half of the in-medium wavelength of the radar wave which is a wavelength of the radar wave when propagating inside the second thickness portion, and a difference between the first thickness and the second thickness is set to an integral multiple of a free-space wavelength of the radar wave which is a wavelength of the radar wave when propagating through a free space.

Effect of the Invention

According to an emblem of the present invention, a first thickness portion having a larger thickness has a thickness equal to an integral multiple of ½ of an in-medium wavelength of a radar wave propagating inside the first thickness portion, and a second thickness portion having a thickness smaller than that of the first thickness portion has a thickness equal to an integral multiple of ½ of the in-medium wavelength of the radar wave propagating inside the second thickness portion, and a difference in thickness between the first thickness portion and the second thickness portion is set to an integral multiple of a free-space wavelength of the radar wave. Therefore, such an effect is produced that constraint that a configuration having concaves and convexes cannot be formed is eliminated and flexibility in design request can be ensured.

EXPLANATIONS OF LETTERS OR NUMERALS 1, 1a emblem
3 antenna
K1 facet on exit side of first thickness portion
K2 facet on exit side of second thickness portion
W1 radar wave passing through first thickness portion
W2 radar wave passing through second thickness portion

BEST MODE(S) FOR CARRYING OUT THE INVENTION

Exemplary embodiments of an emblem according to the present invention will be explained in detail below with reference to the accompanying drawings. The embodiments are not intended to limit the present invention.

Figure 1:
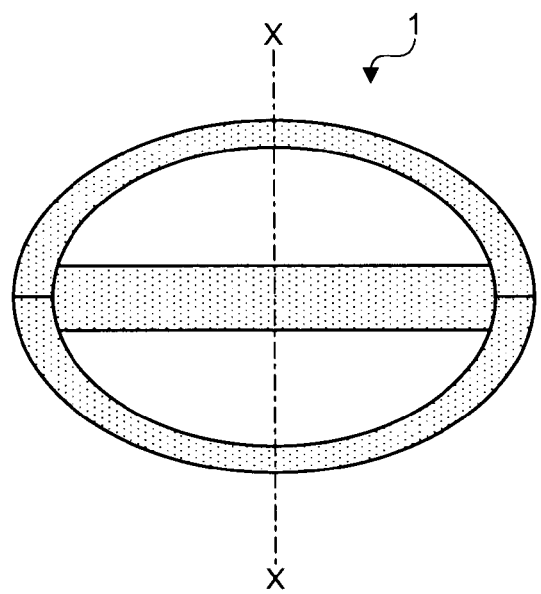
FIG. 1 is a schematic diagram illustrating a structural example of an emblem according to an embodiment of the present invention.
Figure 2:
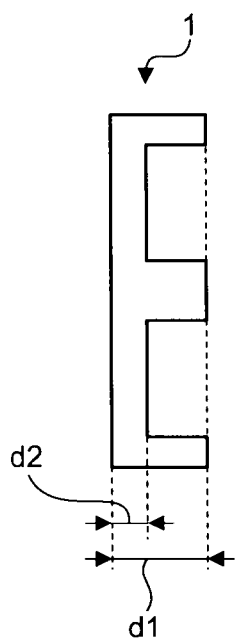
FIG. 2 is a schematic diagram illustrating a cross-sectional structure of the emblem shown in FIG. 1 taken along a line X-X.

FIG. 1 is a schematic diagram illustrating a structural example of an emblem according to an embodiment of the present invention, and FIG. 2 is a schematic diagram illustrating a cross-sectional structure of the emblem shown in FIG. 1 taken along a line X-X.

An emblem 1 is formed, for example, with a resin material to have a characteristic design shape as shown in FIG. 1, and is arranged at a front grille of a vehicle or the like. The emblem 1 is formed to include a portion that has a larger thickness (first thickness portion: thickness d1) corresponding to a shaded portion in FIG. 1 and a portion that is arranged inside the first thickness portion and that has a thickness smaller than that of the first thickness portion (second thickness portion: thickness d2), as shown in FIG. 2.

In the present embodiment, it is assumed that a radar apparatus is provided inside (engine room side) of the front grille for the purpose of measuring a distance between vehicles, or a distance from an obstacle. Therefore, the emblem 1 according to the present embodiment is arranged on a traveling path of a radar wave transmitted from the radar apparatus.

Figure 3:
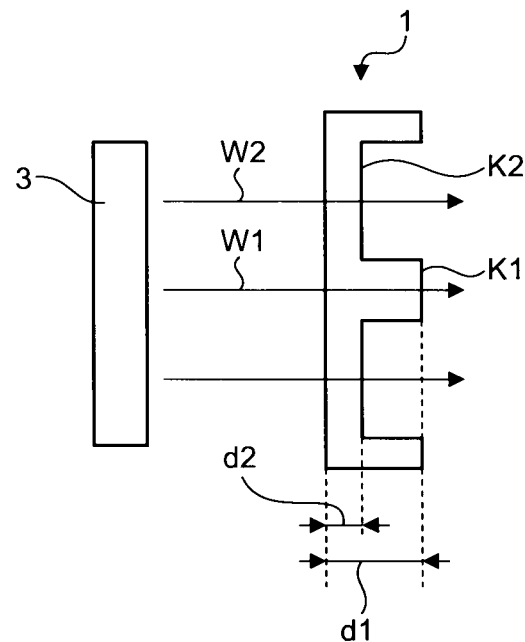
FIG. 3 is a schematic diagram illustrating a state where a radar wave enters the emblem shown in FIG. 2.

FIG. 3 is a schematic diagram illustrating a state where a radar wave enters the emblem 1 shown in FIG. 2. In FIG. 3, a radar wave from an antenna 3 of the radar apparatus enters the emblem 1. Because the radar wave emitted from the antenna 3 is emitted as a plane wave that is in phase at an exit surface of the antenna 3, the radar wave enters also the emblem 1 in phase.

In the emblem 1, the first thickness portion is formed such that the thickness d1 is such a thickness (well-known conditional expression, and hereinafter, "matching thickness") that a radar wave W1 entering the first thickness portion is to be logically non-reflective at an incident surface of the emblem 1. Similarly, the second thickness portion is also formed such that the thickness d2 is to be a matching thickness. The well-known conditional expression that provides a matching thickness d is given by the following equation, where a free-space wavelength of a radar wave is $\lambda$, an incident angle relative to the normal at an incident surface is $\theta$, and a relative dielectric constant of a material is $\in r$.

$$d=\lambda/2(\in r-\sin^2\theta)^{1/2} \quad (1)$$

As described above, because the radar wave entering the emblem 1 is a plane wave, the radar wave enters the incident surface of the emblem 1 substantially perpendicularly thereto. Therefore, when $\theta=0$ degree in Equation (1), Equation (1) can be expressed by the following equation.

$$d=\lambda/2(\in r)^{1/2} \quad (2)$$

A wavelength (in-medium wavelength) $\lambda g$ of a radar wave that propagates inside the emblem 1 is expressed by the following expression.

$$\lambda g=\lambda/(\in r)^{1/2} \quad (3)$$

From Equations (2) and (3), when the first thickness portion and the second thickness portion are formed to satisfy conditional expressions below, the thickness d1 and the thickness d2 become integral multiples of the matching thickness, and therefore, both the first thickness portion and the second thickness portion can be made non-reflective.

$$d1=m\lambda g/2 \ (m \text{ is a positive integer}) \quad (4)$$

$$d2=n\lambda g/2 \ (n \text{ is a positive integer}) \quad (5)$$

where coefficients m and n have a relation of m>n.

Next, a condition that enables the radar wave W1 that passes through the first thickness portion and a radar wave W2 that passes through the second thickness portion to pass the emblem 1 without disturbing wave fronts is explained.

With reference to FIG. 3, an optical path difference $\Delta L(=d1-d2)$ between a facet K1, which is a facet on an exit side of the first thickness portion, and a facet K2, which is a facet on an exit side of the second thickness portion, is considered. At this time, a condition that enables a radar wave passing through the emblem 1 to pass without disturbing a wave front thereof can be expressed by the following equation when this optical path difference $\Delta L$ is an integral multiple of the free-space wavelength $\lambda$.

$$\Delta L=m\lambda g/2-n\lambda g/2=k\lambda \ (k \text{ is a positive integer}) \quad (6)$$

When Equation (3) is substituted in Equation (6), the following equation can be obtained.

$$m-n=2k(\in r)^{1/2} \quad (7)$$

Accordingly, when m and n in Equations (4) and (5) satisfy Equation (7), a difference between the thickness d1 of the first thickness portion and the thickness d2 of the second thickness portion is to be an integral multiple of the free-space wavelength $\lambda$, and therefore, the radar wave passing through the emblem 1 can pass without disturbing the wave front.

For Equation (7) to be completely true, a square root of the relative dielectric constant $\in r$ is required to be an integer. Therefore, the relative dielectric constant $\in r$ is to be limited to a square number such as 4, 9, and 16. However, there is practically no problem if the relative dielectric constant $\in r$ is a value close to a square number. However, because the disturbance of the wave front increases at a rapid rate as the relative dielectric constant $\in r$ becomes farther away from a square number, it is preferable that the relative dielectric constant $\in r$ be within a square number ±10%, and more preferably within a square number ±5%.

Next, some examples that satisfy Equation (7) are explained. Explanation is given assuming that the frequency of a radar wave is 75 GHz (free-space wavelength $\lambda=4$ mm).

FIRST EXAMPLE

In Equation (7), when k=1, m=6, n=2, and $\in r=4$, Equation (7) can be satisfied. At this time, a difference in height between the first thickness portion and the second thickness portion is 4 mm, and it can be set as d1=6 mm and d2=2 mm in FIG. 3, for example. It is only essential that the difference in height between the first thickness portion and the second thickness portion is 4 mm, it can also be set as d1=7 mm and d2=3 mm, for example.

As a material that satisfies $\in r=4$, a material in which glass filler or the like is included in a resin material such as an epoxy resin can be used. As for the resin material such as an epoxy resin, one whose $\in r$ is about 3 is typical, and by increasing a content rate of the glass filler or the like, the relative dielectric constant $\in r$ can be set to a value around 4. In addition, inclusion of the glass filler or the like gives an effect that strength of the emblem itself is increased.

SECOND EXAMPLE

In Equation (7), when k=2, m=9, n=1, and $\in r=4$, this Equation (7) can be satisfied. At this time, a difference in height between the first thickness portion and the second thickness portion is 8 mm, and it can be set as d1=10 mm and d2=2 mm in FIG. 3, for example.

THIRD EXAMPLE

Figure 4:
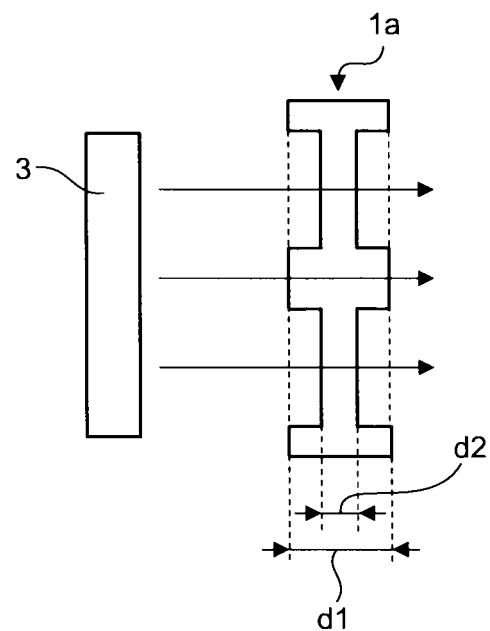
FIG. 4 is a schematic diagram illustrating an example of the emblem according to the exemplary embodiment of the present invention.

While in the first example, the difference in height between the first thickness portion and the second thickness portion is set to 4 mm, this difference in height is desired to be set to 2 mm, for example, depending on designs. In such a case, for example, as an emblem 1a shown in FIG. 4, a configuration having concaves and convexes can be arranged also on the incident surface side of the radar wave, symmetrically to the exit surface side. Even if the emblem 1a having such a shape is formed, because an appearance viewed from a front side of the emblem (exit surface side) can be maintained, the design request in the case of the difference in height being 4 mm can be satisfied.

While in the above embodiment and the examples, explanation has been given in a case where the incident surface and the exit surface of the emblem are in flat plate forms, they are not limited to the flat plate forms, and can be forms including curvature. Particularly, when a radar wave output from an antenna is not a complete plane wave but forms a wave front having a certain curvature, it is possible to make an influence of disturbance of the wave front when the radar wave passes through the emblem small by forming an emblem to have curvature corresponding to the wave front. Accordingly, prevention of degradation of the radar performance can be effectively achieved.

While in the above embodiment and the examples, explanation has been given in a case where the first thickness portion and the second thickness portion are formed of the same material, the materials are not necessarily the same in principle, and the first thickness portion and the second thickness portion can be formed of different materials (∈r can also be different from each other).

Industrial Applicability

As described above, the emblem according to the present invention is useful as an invention that ensures flexibility in design request.

The invention claimed is:

1. An emblem configured to be arranged on a traveling path of a radar wave that is transmitted from an in-vehicle radar apparatus, the emblem comprising:
    a first thickness portion having a first thickness measured from a point of incidence of the radar wave on the emblem to a point of exit of the radar wave from the emblem; and
    a second thickness portion having a second thickness thinner than the first thickness, the second thickness measured from a point of incidence of the radar wave on the emblem to a point of exit of the radar wave from the emblem, wherein
    the first thickness is equal to an integral multiple of a half of an in-medium wavelength of the radar wave which is a wavelength of the radar wave when propagating inside the first thickness portion,
    the second thickness is a thickness equal to an integral multiple of a half of the in-medium wavelength of the radar wave which is a wavelength of the radar wave when propagating inside the second thickness portion,
    a difference between the first thickness and the second thickness is set to an integral multiple of a free-space wavelength of the radar wave which is a wavelength of the radar wave when propagating through a free space, and
    relative dielectric constants of the first thickness portion and the second thickness portion are within a range of a square number plus or minus a tolerance, where the square number is larger than one.

2. The emblem according to claim 1, wherein the first thickness portion and the second thickness portion are formed of a same material.

3. The emblem according to claim 1, wherein the tolerance is 10% of the square number.

4. The emblem according to claim 1, wherein
    the first thickness portion is formed of a first material, and
    the second thickness portion is formed of a second material.

5. The emblem according to claim 1, wherein the tolerance is 5% of the square number.

6. The emblem according to claim 1, wherein an incident surface side of the emblem facing the in-vehicle radar apparatus includes concave and convex portions symmetrical to an exit surface side of the emblem facing away from the in-vehicle radar apparatus.

7. The emblem according to claim 1, wherein curvature of the emblem corresponds to curvature of the radar wave transmitted from the in-vehicle radar apparatus.

* * * * *